United States Patent [19]

Beatty et al.

[11] 4,222,982

[45] Sep. 16, 1980

[54] PROCESS FOR PREPARING TONER OF IMPROVED MECHANICAL PROPERTIES

[75] Inventors: Charles L. Beatty, Webster; Jean-Claude Pollet, Rochester, both of N.Y.

[73] Assignee: Xerox Corporation, Stamford, Conn.

[21] Appl. No.: 4,633

[22] Filed: Jan. 19, 1979

[51] Int. Cl.$^3$ .............................................. B29C 17/00

[52] U.S. Cl. ............................... 264/143; 260/37 NP; 260/42.21; 264/151; 264/176 R; 264/176 F; 264/210.8; 264/211

[58] Field of Search ............ 264/140, 143, 151, 176 F, 264/176 R, 210 F, 138, 210.8; 260/37 NP, 42.21, 40 P, 40 R; 252/62.1

[56] References Cited

U.S. PATENT DOCUMENTS

| | | | |
|---|---|---|---|
| 2,316,283 | 4/1943 | Piperoux et al. | 264/140 |
| 2,516,295 | 7/1950 | Borton et al. | 264/140 |
| 3,309,441 | 3/1967 | Burczyk et al. | 264/140 |
| 3,640,861 | 2/1972 | Hsia | 264/140 |
| 4,001,357 | 1/1977 | Walz et al. | 264/14 |

FOREIGN PATENT DOCUMENTS

| | | | |
|---|---|---|---|
| 47-33727 | 8/1972 | Japan | 264/176 F |

*Primary Examiner*—Jay H. Woo

*Attorney, Agent, or Firm*—E. O. Palazzo

[57] ABSTRACT

A process for preparing electrostatographic toner particles having improved mechanical properties and controlled particle size and size distribution is provided through molecular orientation of glassy, brittle, semicrystalline, low molecular weight polymers. Molecular orientation results in more flexible polymers and greatly increases their yield stress, modulus and mechanical fatigue lifetime. The molecular orientation of these polymers is obtained by extrusion of fibers or films thereof.

6 Claims, 3 Drawing Figures

EXTRUSION AND MOLECULAR ORIENTATION APPARATUS

EXTRUSION AND MOLECULAR
ORIENTATION APPARATUS

OPTICAL MICROGRAPH OF KNOTTED MOLECULARLY ORIENTED STYRENE-N-BUTYL METHACRYLATE FIBER

OPTICAL MICROGRAPH OF MOLECULARLY ORIENTED STYRENE-N-BUTYL METHACRYLATE FIBER

PROCESS FOR PREPARING TONER OF IMPROVED MECHANICAL PROPERTIES

This invention relates to electrostatographic imaging systems, and more particularly, to improved developing materials, their manufacture and use.

The formation and development of images on the surface of photoconductive materials by electrostatic means is well known. The basic xerographic process, as taught by C. F. Carlson in U.S. Pat. No. 2,297,691, involves placing a uniform electrostatic charge on a photoconductive insulating layer, exposing the layer to a light-and-shadow image to dissipate the charge on the areas of the layer exposed to the light and developing the resulting latent electrostatic image by depositing on the image a finely-divided electroscopic material referred to in the art as "toner." The toner will normally be attracted to those areas of the layer which retain a charge, thereby forming a toner image corresponding to the latent electrostatic image. This powder image may then be transferred to a support surface such as paper. The transferred image may subsequently be permanently affixed to the support surface as by heat. Instead of latent image formation by uniformly charging the photoconductive layer and then exposing the layer to a light-and-shadow image, one may form the latent image by directly charging the layer in image configuration. The powder image may be fixed to the photoconductive layer if elimination of the powder image transfer step is desired. Other suitable fixing means such as solvent or overcoating treatment may be substituted for the foregoing heat fixing steps.

Several methods are known for applying the electroscopic particles to the electrostatic latent image to be developed. One development technique, as disclosed by E. N. Wise in U.S. Pat. No. 2,618,552, is known as "cascade" development. In this method, a developer material comprising relatively large carrier particles having finely-divided toner particles electrostatically coated thereon is conveyed to and rolled or cascaded across the electrostatic latent image-bearing surface. It is apparent that the toner is subjected to severe mechanical attrition which tends to break down the particles into undesirable dust fines. The formation of fines is retarded when the toner contains a tough, high molecular weight resin which is capable of withstanding the shear and impact forces imparted to the toner in the machine. Unfortunately, many high molecular weight materials cannot be employed in high speed automatic machines because they cannot be rapidly fused during a powder image heat fixing step. Attempts to rapidly fuse a high melting point toner have required large high capacity heating units and resulted in further difficulty of adequately dissipating the heat evolved from the fusing unit. On the other hand, low molecular weight resins which are easily heat fused at relatively low temperatures are usually undesirable because these materials tend to form thick films on reusable photoconductor surfaces. These films tend to cause image degradation and contribute to machine maintenance down-time. Additionally, some low molecular weight resins are often extremely difficult or even impossible to comminute in conventional grinding apparatus. Further, low molecular weight resin toners have a strong tendency to "impact" or become welded on the surface of carrier particles thus adversely affecting the tribolelectric properties of developer mixtures.

In addition, present-day high speed electrostatographic copying and duplicating processes have placed new demands upon dry ink toner materials requiring that they be of controlled size and narrow size distribution as well as having consistent and stable mechanical and electrostatographic properties. It is therefore important to be able to prepare these materials by a process which is easy to carry out and which is precisely duplicatable. Thus, in prior art toner fabrication processes, toner materials are usually prepared by mechanical grinding of coarse colored resin particles, by dissolving polymer material in a solvent which is then precipitated in finely-divided form, or by suspending polymer particles in a liquid medium with the aid of dispersing agents after which the dispersion is subjected to high shear agitation. However, all these toner fabrication processes suffer from various disadvantages. For example, grinding and size classifying colored, bulk resins is expensive, requires excessive power, close control, and special equipment. Even then, an appreciable part of the classified toner material is off-size and must be reprocessed or wasted. In addition, the particles thus produced are irregular and non-uniform in shape. In the solution fabrication process, there are difficulties in handling the solvent and in completely removing the solvent from the polymer particles. Also, the resulting particles are in a wide size distribution and must be classified where particles of a narrow size distribution are desired. Similarly, in the dispersion process, the polymer particles must be suspended in a liquid medium, usually with the aid of dispersing agents added thereto in a seperate step preceding dispersion of the polymer in the liquid medium. Further, the presence of dispersing agent residues in the polymer generally creates undesirable changes in the properties of the toner material such as increased sensitivity to relative humidity fluctuations and reduced electrical resistivity. Removal of these residues is difficult, if not impossible, for practical purposes. Also, little control of the physical characteristics of the toner particles is available. Therefore, since prior art toner fabrication processes are deficient in one or more of the aforementioned areas, there is a continuing need for improved toners and developers and their manufacture.

SUMMARY OF THE INVENTION

Figure 1:
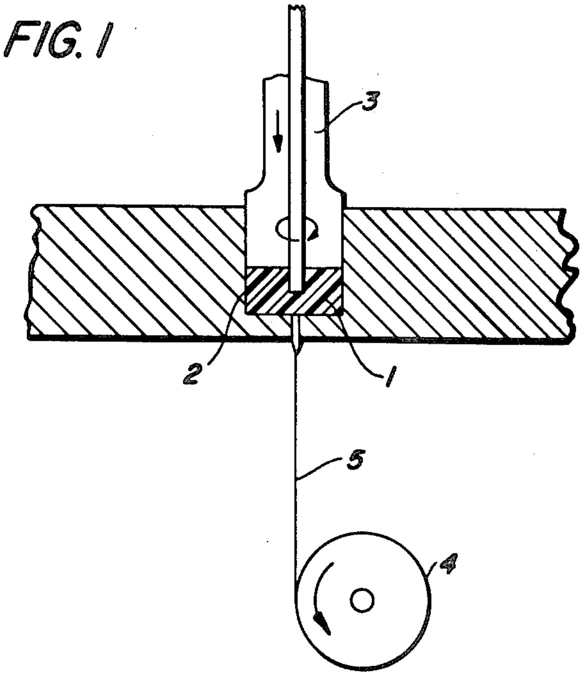
FIG. 1 is a perspective view of an extrusion and orientation apparatus which can be utilized in preparing the fibers of colored polymeric materials.

It is, therefore, an object of this invention to provide developer materials and a fabrication process therefor overcoming the above-noted deficiencies.

It is another object of this invention to provide electrostatographic toner materials possessing significantly improved mechanical properties and controlled geometry.

It is a further object of this invention to provide electrostatographic toner materials having controlled sizes and a narrow size distribution.

It is another object of this invention to provide electrostatographic toner materials from brittle, low molecular weight polymers which are more resistant to mechanical fatigue and impaction on electrostatographic carrier materials.

It is another object of this invention to provide electrostatographic toner and developer materials having physical and electrostatographic properties superior to those of known toner and developer materials.

The above objects and others are accomplished by providing a process for preparing pigmented polymer powders of controlled particle size and size distribution having consistent physical, chemical, mechanical and electrostatographic properties. In accordance with this invention, improved electrostatographic toner particles are prepared through the molecular orientation of glassy, brittle, semi-crystalline low molecular weight polymers. Molecular orientation of such polymers results in more flexible polymers and greatly increases their yield stress, modulus and mechanical fatigue lifetime. The effect of this result is that the mechanical properties of toner materials are significantly improved without increasing the molecular weight of toner polymers. Further, since the melt viscosity of toner materials made from molecularly oriented polymer materials is identical to that of the molecularly unoriented polymer materials, the fusing properties of the toner materials are unaffected.

In accordance with this invention, the molecular orientation of brittle, low molecular weight polymers, that is, polymers having a number average molecular weight of up to about 260,000, may be achieved by extrusion of fibers or films of the low molecular weight polymers by orientation techniques such as in textile fiber forming and in uniaxial and biaxial orientation of plastic films, combined with further drawing during the solidification step. Pursuant to such molecular orientation, the toner materials of this invention have significantly improved mechanical properties in the direction of orientation. Although it may be expected that the mechanical properties of the toner materials in the direction perpendicular to orientation may be decreased, compression of the toner materials in the direction perpendicular to the orientation direction results in ductile deformation and not fracture. Surprisingly, the oriented polymers employed in this invention are highly resistant to physical degradation, film formation and impaction at relatively low molecular weights compared to conventional resin polymers.

In the molecular orientation step, selection of extrusion die geometry allows fabrication of fibers of various cross-sectional shapes. For example, a square die may be employed to provide particles cut to size having a length to diameter ratio of 1.0 resulting in cube-shaped toner particles. In addition, the extrusion and orientation conditions may be well controlled resulting in a nearly monodisperse distribution of cross-sectional dimensions such as diameter. Further, by variation of toner particle geometry, different triboelectric properties may be provided to developer mixtures thereof, as well as different rates of toner impaction due to changes in the type and degree of contact between toner and carrier particles. In addition, since the production of dusty "fines" obtained by prior art attrition toner preparation processes is eliminated, background deposition of toner particlex is significantly reduced thereby improving developed image background quality. Likewise, developer homogeniety is improved resulting in better flow, more uniform image coverage, and improved solid area density. The overall effect of polymer orientation in addition to the improvement of the mechanical properties of the resultant toner particles is the attainment of developer mixtures having longer useful lifetimes and providing improved copy quality.

Thus, in accordance with this invention and by selection of the processing conditions, it is possible to modify, control and standardize the properties of electrostatographic toner particles and developer mixtures made therewith. Due to control of the fabrication process, it is unnecessary to subsequently classify these colored powders for the desired average particle size, and size distribution. The colorant can be uniformly distributed throughout the toner particles by compounding or preblending the bulk polymer with a pigment or dye, thus providing a uniform color effect which is also stable and durable. Pursuant to processing in accordance with this invention, the particles have a regular shape providing superior powder flow and fluidization characteristics and less variation in particle characteristics. It is therefore possible to produce toner powders particularly suitable for electrostatographic copying and duplicating. Because of the large number of variables that can be controlled to affect the shape, size and size distribution of the particles, the process of the invention is of extraordinary versatility. For any given type of resin, it is possible so to adjust the operating parameters as to produce particles in a regular shape and surface configuration and of any size within the range from about 1 to about 30 microns, controlled within a very narrow size distribution. This is accomplished by selection of the appropriate process variables, and standardizing the process operating conditions to obtain the desired size and shape of particles.

Figure 3:
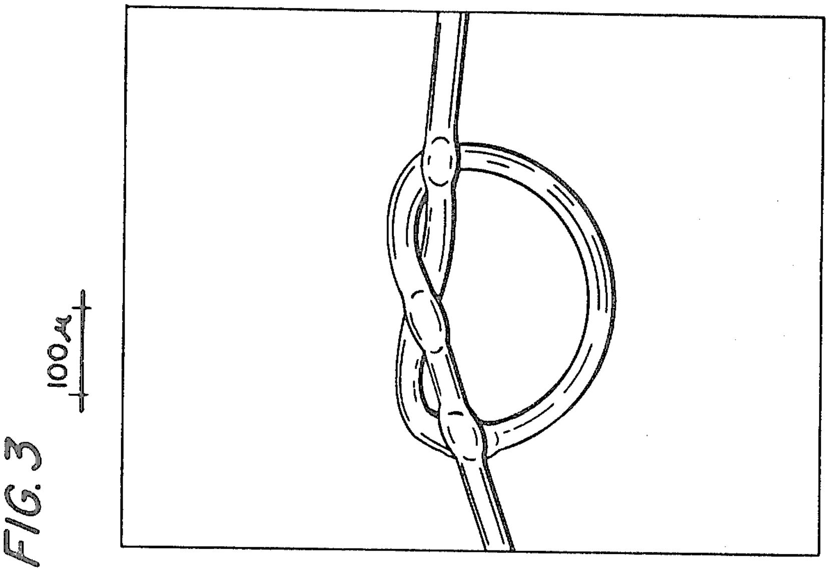
FIG. 3 is a perspective view of illustrating the there was achieved a level of orientation that resulted in an increase of breaking strain from less than 0.02 to 0.25, for a styrene n-butylmethacrylate copolymer.
Figure 2:
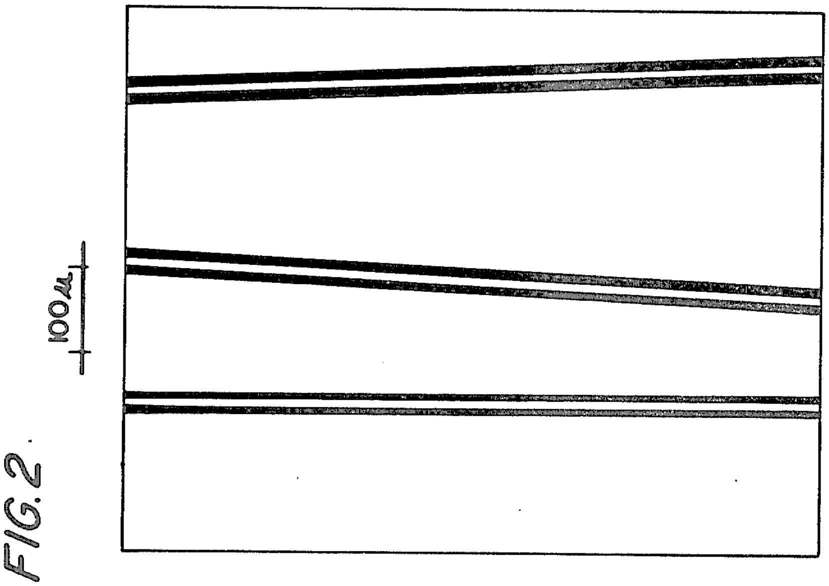
FIG. 2 is a perspective view illustrating that the fibers having a diameter of about 20 microns are obtained after treatment in the extrusion apparatus.

The process of this invention is normally carried out by forming a blend of the polymeric material and the coloring agent, with or without other additives. The blend is fed in liquid form or as a flowable extrudate, with or without agitation, and brought to the desired operating temperature, typically above the initial melting temperature of the polymer, and then extruded and drawn to obtain the desired molecular orientation, shape, particle size and size distribution. Thus, fibers of colored polymer materials are prepared in accordance with the extrusion and orientation apparatus illustrated in FIG. 1. In FIG. 1, melted toner components 1 are placed in mixing and heating cup 2 containing rotor 3 wherein toner components are drawn to variable speed drum 4. From this apparatus, fibers 5 having a diameter of about 20 microns can be directly obtained as depicted in FIG. 2. Molecular orientation of the unpigmented fibers is measured by birefringence as a function of molecular weight ranging from about $10\times10^3$ to about $20\times10^{-3}$ for styrene-n-butyl methacrylate copolymers (65:35 weight ratio) having a number average molecular weight of between about 33,000 and 162,000. By varying the fabrication conditions, the degree of orientation may be controlled. Breaking strains were determined by flexing the fibers around cylinders of different diameters until failure occurred. It was found that the achieved level of orientation resulted in an increase of breaking strain from less than 0.02 to 0.25 for a styrene-n-butyl methacrylate copolymer having a melt index of 50 as is vividly illustrated in FIG. 3. Similar breaking strains were obtained for a styrene-n-butyl methacrylate copolymer containing about 10 percent by weight of carbon black although orientation measurement via birefringence was not possible due to material opacity when the copolymer is pigmented or dyed.

In accordance with this invention, any suitable polymer material may be employed in the fabrication of toner particles. However, it is preferred that low molecular weight polymer materials be employed since the energy requirements to fuse the resultant toner particles deposited on the electrostatic latent image are substantially lessened. Typical polymer materials include natural resins, thermoplastic resins, or partially cured thermosetting resins. Typical natural resins include: caoutchouc, colophony, copal, dammar, dragon's blood, jalap, storax, and mixtures thereof. Typical thermoplastic resins include: the polyolefins such as polyethylene, polypropylene, chlorinated polyethylene, and chlorosulfonated polyethylene, polyvinyls and polyvinylidenes such as polystyrene, polymethylstyrene, polymethylmethacrylate, polyacrylonitrile, polyvinylacetate, polyvinylalcohol, polyvinylbutyral, polyvinylchloride, polyvinylcarbazole, polyvinyl ethers, and polyvinyl ketones: fluorocarbons such as polytetrafluoroethylene, polyvinylfluoride, polyvinylidene fluoride and polychlorotrifluoroethylene; polyamides such as polycaprolactam and polyhexamethylene adipimide; polyesters such as polyethylene terephthalate; polyurethanes; polysulfides; polycarbonates; and mixtures thereof. Typical thermosetting resins include: phenolic resins such as phenol formaldehyde, phenol furfural and resorcinol formaldehyde; amino resins such as urea formaldehyde and melamine formaldehyde; polyester resins; epoxy resins; and mixtures thereof. Styrene-n-butyl methacrylate is preferred because of its excellent triboelectric characteristics. Preferably, the resins of this invention are selected to have a melting point of between about 110° F. and about 240° F. for maximum fusing efficiency in high speed copying and duplicating machines. Following orientation of the polymers in accordance with this invention, the fibers thereof are cut to the desired size by mechancal cutting, laser cutting, ball-milling on any suitable cutting process.

Any suitable pigment or dye may be employed as the colorant for the toner particles. Toner colorants are well known and include, for example, carbon black, nigrosine dye, aniline blue, Calco Oil Blue, chrome yellow, ultramarine blue, Quinoline Yellow, methylene blue chloride, Monastral Blue, Malachite Green Oxalate, lampblack, Rose Bengal, Monastral Red, Sudan Black BN, and mixtures thereof. The pigment or dye should be present in the toner in a sufficient quantity to render it highly colored so that it will form a clearly visible image on a recording member. Thus, for example, where conventional xerographic copies of typical documents are desired, the toner may comprise a black pigment such as carbon black or a black dye such as Sudan Black BN dye available from General Aniline and Film Corporation. Preferably, for sufficient color density, the pigment is employed in an amount of from about 1% to about 20% by weight, based on the total weight of the colored toner. If the toner colorant employed is a dye, substantially smaller quantities of colorant may be used. The colorants may be mixed with the resin component prior to, during or after the resin component is polymerized. Obviously, any colorant which inhibits polymerization should be blended with the resin after the resin is formed.

When the toner mixtures of the invention are to be employed in cascade development processes, the toner should have an average particle diameter less than about 30 microns and for magnetic brush development, preferably between about 5 and about 17 microns for optimum results. For use in powder cloud development methods, particle diameters of slightly less than 1 micron are preferred.

Suitable coated and uncoated carrier materials for cascade and magnetic brush development are well known in the art. The carrier particles may be electrically conductive, insulating, magnetic or non-magnetic, provided that the carrier particles acquire a charge having an opposite polarity to that of the toner particles when brought in close contact with the toner particles so that the toner particles adhere to and surround the carrier particles. When a positive reproduction of an electrostatic image is desired, the carrier particle is selected so that the toner particles acquire a charge having a polarity opposite to that of the electrostatic latent image. Alternatively, if a reversal reproduction of the electrostatic image is desired, the carriers are selected so that the toner particles acquire a charge having the same polarity as that of the electrostatic image. Thus, the materials for the carrier particles are selected in accordance with their triboelectric properties in respect to the electroscopic toner so that when mixed or brought into mutual contact, one component of the developer is charged positively if the other component is below the first component in the triboelectric series and negatively if the other component is above the first component in the triboelectric series. By proper selection of materials in accordance with their triboelectric effects, the polarities of their chage when mixed are such that the electroscopic toner particles adhere to and are coated on the surface of carrier particles and also adhere to that portion of the electrostatic imagebearing surfaces having a greater attraction for the toner than the carrier particles. Typical carriers include sodium chloride, ammonium chloride, aluminum potassium chloride, Rochelle salt, sodium nitrate, aluminum nitrate, potassium chlorate, granular zircon, granular silicon, methyl methacrylate, glass, silicon dioxide, electromagnetic materials such as nickel, steel, iron, ferrites, and the like. The carriers may be employed with or without a coating. Many of the foregoing and typical carriers are described in L. E. Walkup U.S. Pat. No. 2,618,551; L. E. Walkup et al. in U.S. Pat. No. 2,638,416 and E. N. Wise in U.S. Pat. No. 2,618,552. An ultimate carrier particle diameter between about 50 microns to about 1,000 microns is preferred because the carrier particles then possess sufficient density and inertia to avoid adherence to the electrostatic images during a cascade development process. Adherence of carrier beads to xerographic drum surfaces is undesirable because of the formation of deep scratches on the surface during the image transfer and drum cleaning steps, particularly where cleaning is accomplished by a web cleaner such as the web disclosed by W. P. Graff, Jr. et al. in U.S. Pat. No. 3,186,838. Also, print deletion occurs when carrier beads adhere to xerographic imaging surfaces. Generally speaking, satisfactory results are obtained when about 1 part toner is used with about 10 to about 200 parts by weight of carrier.

The toner compositions of the instant invention may be employed to develop electrostatic latent images on any suitable electrostatic latent image-bearing surface including conventional photoconductive surfaces. Well-known photoconductive materials include vitreous selenium, organic or inorganic photoconductors embedded in a non-photoconductive matrix, organic or inorganic photoconductors embedded in a photoconductive matrix, and the like. Representative patents in which photoconductive materials are disclosed include U.S. Pat. No. 2,803,542 to Ullrich, U.S. Pat. No. 2,970,906 to Bixby, U.S. Pat. No. 3,121,006 to Middleton, U.S. Pat. No. 3,121,007 to Middleton, and U.S. Pat. No. 3,151,982 to Corrsin.

DESCRIPTION OF PREFERRED EMBODIMENTS

The following examples further define, describe and compare methods of preparing the toner materials of the present invention and of utilizing them to develop electrostatic latent images. Parts and percentages are by weight unless otherwise indicated.

EXAMPLE I

A toner material was prepared by combining about 10 parts by weight of carbon black and about 90 parts by weight of a 65/35 styrene-n-butyl methacrylate random copolymer having a number of average molecular weight of between about 40,000 and about 80,000. This copolymer has a nearly symmetrical molecular weight distribution with a weight to number average molecular weight ratio of approximately 2.5. After melting and preliminary mixing, the composition was blended to yield a uniformly dispersed composition of the carbon black in the thermoplastic resin body. The quality of carbon black dispersion can be controlled by variation of shear rate and/or temperature and time of blending. Dielectric constant measurements are utilized to determine when uniform carbon black dispersion is achieved.

The resulting blended composition was then extruded employing a model CS 183 MM-018 laboratory extruder having a circular orifice of approximately 1/16 inch in diameter available from Custom Scientific Instruments, Inc., Whippany, New Jersey. The extrudate was then taken up on a rotating drum, as shown in FIG. I, and drawn to achieve further orientation of the extruded material. The degree or extent of molecular orientation and dimension of the extrudate achieved by the extrusion and take up process can be controlled by varying the velocity of the take-up rotating drum, the temperature of the molten polymer in the extruder, the size of the extruder orifice, and the flow rate of extrusion.

As a control, extension of unpigmented polymers under similar conditions is used to determine the degree of orientation by birefringence measurements. Also, the effect of orientation on the mode of deformation, i.e., ductile versus brittle, was determined by flexing the cooled extrudate around cylinders of different diameters, i.e., 0.5 millimeter up to 5 centimeters in diameter.

Following extrusion, the extrudate may be cut into particle lengths of about ½ to 1 inch which is then ball-milled to achieve toner particle cylinders having a particle size diameter of between about 5 and 10 10 microns and particle lengths of between about 10 and 40 microns.

EXAMPLE II

A toner material was prepared by combining about 10 parts by weight of carbon black and about 90 parts by weight of a 65/35 styrene-n-butyl methacrylate random copolymer having a number average molecular weight of between about 40,000 and about 80,000. This copolymer has a nearly symmetrical molecular weight ratio of approximately 2.5. After melting and preliminary mixing, the composition was blanded to yield a uniformly dispersed composition of the carbon black in the thermoplastic resin body.

The resulting blended composition was then extruded employing a model CS 183 MM-018 laboratory extruder having an elonagted slit opening available from Custom Scientific Instruments, Inc., Whippany, N.J. The extruded film was then taken up on a rotating drum and drawn to achieve further orientation of the extruded sheet material.

Following extrusion and drawing, the sheet material may be cut to toner particle size by placing it into a gear mesh arrangement cutting device.

EXAMPLE III

A toner material is prepared by combining about 10 parts by weight of carbon black and about 90 parts by weight of a polystyrene having a number average molecular weight of between about 80,000 and about 120,000. After melting and preliminary mixing, the composition is blended to yield a uniformly dispersed composition of the carbon black in the thermoplastic resin body.

The resulting blended composition is then extruded and taken up on a rotating drum as in Example I. The extruded and drawn composition may then be cut to any desired toner particle size by any suitable means including that described in Example I.

EXAMPLE IV

A toner material is prepared by combining about 10 parts by weight of carbon black and about 90 parts by weight of a diglycidyl ether of bisphenol A having a weight average molecular weight of between about 20,000 and about 40,000 available under the tradename Epon 1007, 1009, 1010 and 1053, from Shell Chemical Company, Houston Texas. After melting and preliminary mixing, the composition is blended to yield a uniformly dispersed composition of the carbon black in the thermoplastic resin body.

The resulting blended composition is then extruded and taken up on a rotating drum as in Example I. The extruded and drawn composition may then be cut to any desired toner particle size by any suitable means including that described in Example I.

EXAMPLE V

A toner material is prepared by combining about 10 parts by weight of carbon black and about 90 parts by weight of a hexamethylene sebacate having a number average molecular weight of between about 10,000 and about 30,000. After melting and preliminary mixing, the composition is blended to yield a uniformly dispersed composition of the carbon black in the thermoplastic resin body.

The resulting blended composition is then extruted and taken up on a rotating drum as in Example I. The extruded and drawn composition may then be cut to any desired toner particle size by any suitable means including that described in Example I.

Although specific materials and conditions are set forth in the foregoing examples, these are merely intended as illustrations of the present invention. Various other suitable thermoplastic toner resin components, additives, colorants, and processing conditions such as those listed above may be substituted for those in the examples with similar results. Other materials may also be added to the toner or carrier to sensitize, synergize or otherwise improve the fusing properties of other desirable properties of the system.

Other modifications of the present invention will occur to those skilled in the art upon a reading of the present disclosure. These are intended to be included within the scope of this invention.

What is claimed is:

1. A process for preparing electrostatographic toner particles having improved mechanical properties and control particle size and particle size distribution comprising forming a blend comprising a molten mass of polymers having an average molecular weight of up to about 260,000 and a colorant selected from the group consisting of pigments and dyes, extruding the blend to provide molecular orientation to the polymers and drawing the blend during cooling and solidifcation of the polymers.

2. A process for preparing electrostatographic toner particles having improved mechanical properties and controlled particle size and particle size distribution in accordance with claim 1 wherein said polymers have a melting point of between about 110° F. and about 340° F.

3. A process for preparing electrostatographic toner particles having improved mechanical properties and controlled particle size and particle size distribution in accordance with claim 1 wherein said colorant comprises carbon black.

4. A process for preparing electrostatographic toner particles having improved mechanical properties and controlled particle size and particle size distribution in accordance with claim 1 including extruding said blend in the form of fibers thereof.

5. A process for preparing electrostatographic toner particles having improved mechanical properties and controlled particle size and particle size distribution in accordance with claim 4 including cutting said fibers into particles having an average particle diameter of less than about 30 microns.

6. A process for preparing electrostatographic toner particles having improved mechanical properties and controlled particle size and particle size distribution in accordance with claim 1 including extruding said blend in the form of films thereof.

* * * * *